United States Patent [19]

Iwashita

[11] Patent Number: 4,591,979
[45] Date of Patent: May 27, 1986

[54] DATA-FLOW-TYPE DIGITAL PROCESSING APPARATUS

[75] Inventor: Masao Iwashita, Tokyo, Japan

[73] Assignee: NEC Corporation, Tokyo, Japan

[21] Appl. No.: 526,310

[22] Filed: Aug. 25, 1983

[30] Foreign Application Priority Data

Aug. 25, 1982 [JP] Japan ................... 57-147201

[51] Int. Cl.⁴ .............. G06F 13/00; G06F 7/00; G06F 9/38; G06F 3/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,813,652 | 5/1974 | Elmer et al. | 364/200 |
| 3,962,706 | 6/1976 | Dennis et al. | 364/900 |
| 3,978,452 | 8/1976 | Barton et al. | 364/200 |
| 4,117,541 | 9/1978 | Ali | 364/724 |
| 4,145,733 | 3/1979 | Misunas et al. | 364/200 |
| 4,153,932 | 5/1979 | Dennis et al. | 364/200 |
| 4,156,903 | 5/1979 | Barton et al. | 364/200 |
| 4,156,908 | 5/1979 | Missios et al. | 364/200 |
| 4,232,366 | 11/1980 | Levy et al. | 364/200 |
| 4,270,181 | 5/1981 | Tanakura et al. | 364/200 X |
| 4,286,330 | 8/1981 | Isaacson | 364/900 |
| 4,305,124 | 12/1981 | Marro et al. | 364/200 |
| 4,310,879 | 1/1982 | Pandeya | 364/200 |
| 4,378,589 | 3/1983 | Finnegan et al. | 364/200 |

OTHER PUBLICATIONS

Byte, vol. 10, No. 12, Nov. 1985, (McGraw-Hill), "The yPD7281 Processor", by Tom Jeffery, pp. 237-240.

Primary Examiner—Raulfe B. Zache
Assistant Examiner—William G. Niessen
Attorney, Agent, or Firm—Sughrue, Mion, Zinn, Macpeak & Seas

[57] ABSTRACT

A data processing apparatus having a dataflow architecture includes an addressor module, an operational module and a memory module, and data to be processed is accompanied by a command and is applied to the respective module through a uni-directional bus. The addressor module and the operational module are integrated within a common hardware circuit having a feedback loop. A normal operation (an arithmetic and logic operation) is executed by the common hardware circuit by using only the uni-directional bus, while an address generating operation is executed by the common hardware circuit by using the uni-directional bus and the feedback loop.

4 Claims, 4 Drawing Figures

DATA-FLOW-TYPE DIGITAL PROCESSING APPARATUS

FIELD OF THE INVENTION

This invention relates to a data processing apparatus, and more particularly to address generation in a dataflow-type processor.

DESCRIPTION OF THE PRIOR ART

The dataflow-type processor was proposed as a new computer architecture achieving concurrent operation without being controlled by a central processing unit (CPU). The computer architecture proposed by J. von Neumann and now widely employed does utilize a CPU which centrally controls a programmed sequence by means of a memory access. That is, a data processing flow is detected by the CPU and data to be processed is directly transferred to its own destination designated by the CPU and then is processed. However, this architecture requires a large number of memory accesses for designating the destination of a data transfer and, therefore, high speed processing is difficult. To overcome such a shortcoming in the von Neumann type data processor, a dataflow processing technique was proposed. According to the dataflow processing technique, data to be processed is accompanied by a destination code for designating a processing module to which that data is to be transferred. The data is transferred through a data bus without being controlled by a CPU. Therefore, it can be said that the dataflow processing is different from the von Neumann type processing and is especially suitable for a high speed data processing.

A dataflow processor comprises a plurality of processing modules, such as a control module, an addressor module, and an operational module, which are serially coupled to each other in a predetermined order. Data is transferred through each module in one direction. Therefore, data processing can be executed in parallel in the respective modules, so that the dataflow processor is very suitable for a pipeline operation. However, since a data flows only in one direction, an addressor module used for generating address data must be different from the operational module used for a logical operation and an arithmetic operation. Therefore, many hardware modules are necessary for the conventional dataflow processor, and it is difficult to integrate it on one semiconductor chip. Where the addressor module is formed on a chip different from a chip of the operational module, the access speed for a memory becomes very low because the memory is included in the operational module. If there is no addressor module and addresses are generated in the operational module under a program control (software control), a very long period is required to generate addresses.

An object of the present invention is to provide a data flow type processing apparatus having a common hardware circuitry for a logical or an arithmetical operation and for address generation.

Another object of the present invention is to provide a dataflow processor capable of an integration on a single semiconductor chip.

Still another object of the present invention is to provide a dataflow processor having a high performance.

SUMMARY OF THE INVENTION

A dataflow processor according to the present invention comprises an input latch circuit receiving an input data and a command, an output latch circuit outputting an output data, an operational circuit executing a logical operation (such as logical OR or logical AND operation) and/or an arithmetical operation (such as an adder operation or a subtracter operation), which is coupled between the input latch circuit and the output latch circuit, a multiplexer circuit coupled to the input latch circuit and to the output latch circuit for applying either one of the input data from the input latch circuit and the output data of the output latch circuit to the operational circuit, and a control circuit for applying a selecting signal to select either the input data or the output data to the multiplexer circuit according to the command received by the input latch circuit. The input latch circuit and the output latch circuit are adapted to data in synchronism with a pipeline clock.

The dataflow processor of the present invention introduces a feedback loop into a uni-directional data flow to return output data to the operational circuit. The multiplexer circuit selectively applies to the operational circuitry either the input data or the feedback data from the same operational circuitry. As a result, a logical or an arithmetic operation may be carried out using the input data and numerical values may be generated using the feedback data. In particular, the numerical value generation may be executed such that the operational circuitry adds the feedback value to an increment value which is applied thereto as another input data and this adding operation is performed predetermined times to generate a predetermined number of numerical values. This operation may be performed during an idle time of the logical or the arithmetical operation. Moreover the numerical values to be generated may be addresses.

According to the present invention, an operational module with a function of an addressor can be integrated on a small-size chip. Further, a complex software control for producing addresses is not required. Thus, performance of an operational pipeline unit can be increased. It is noted that input data must be accompanied by a command to designate an address generation, the number of addresses to be generated, and an increment value.

DETAILED DESCRIPTION OF THE INVENTION

Figure 1:
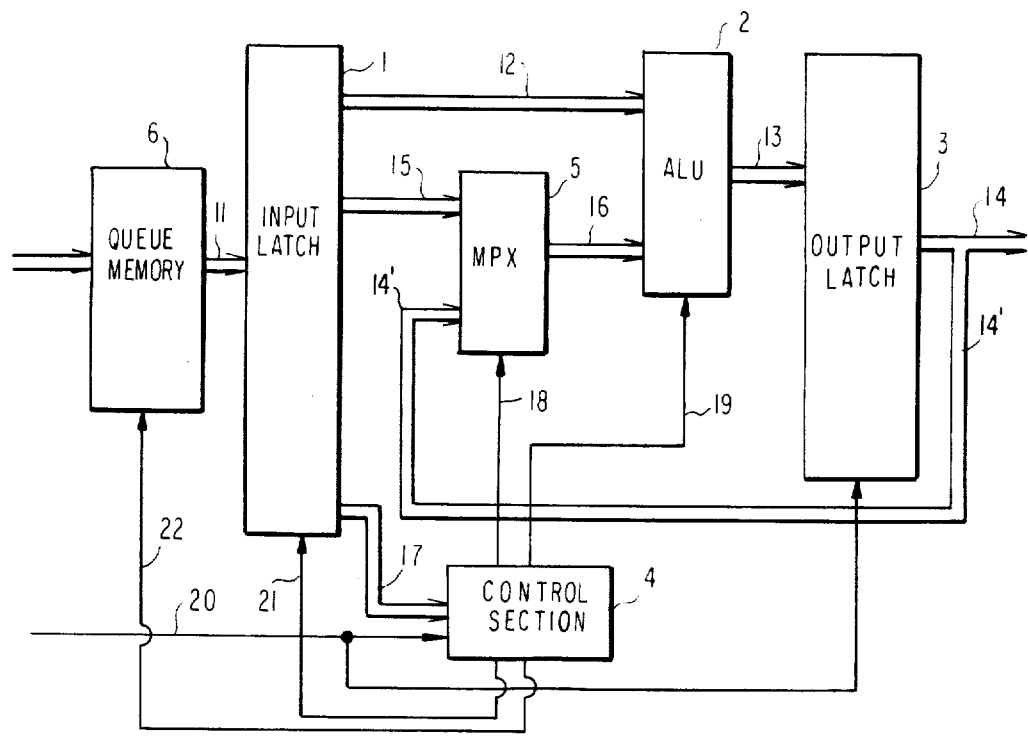
FIG. 1 shows a block diagram of one embodiment according to the present invention.

FIG. 1 is a block diagram of an embodiment of the present invention, and more particularly shows an operational module with an addressor function in a dataflow processor executing a pipeline operation. It comprises an input latch 1, an arithmetic and logical unit (ALU) 2 operating a logical operation or an arithmetical operation, an output latch 3, and a multiplexer (MPX) 5. An input data is applied to the input latch through a bus 11 from a queue memory 6. The input data consists of a data portion having first and second data and a command portion as described below. A first data is directly transferred to ALU 2 through a bus 12, and a second data is transferred through a bus 15 to MPX 5. An output of ALU is transferred via a bus 13 to the output latch 3, and its output data is transferred through a bus 14 to a next pipeline stage and also is returned through a bus 14' to the MPX 5. An output of the MPX 5 is selected by a control section 4 and is applied to the ALU 2 through a bus 16. A command received in the input latch 1 is transferred to the control section 4 through a bus 17. The control section 4 generates control signals 18, 19, 21 and 22. The signal 18 is a select signal for MPX 5 to select either the input bus 15 from the input latch 1 or the feedback bus 14' from the output latch 3, according to a partial bit of the command. The signal 19 designates operation of ALU 2. The signal 21 is a clock pulse for the input latch 1, and the signal 22 is a busy signal for the queue memory 6.

An input data is transferred to the input latch 1 via the queue memory 6 and is latched in response to the clock pulse 21. The ALU 2 executes an operation by using two kinds of data and the resulting data is transferred to the output latch 3. That is, the ALU 2 can make a diadic operation by using two data. One of the data received by the ALU 2 is the first input data of the input latch 1 on bus 12, and the other is output of the MPX 5 on bus 16, that is, either the second input data from bus 15 or the feedback output data from bus 14'. The control section 4 selects either the second input data from the input latch 1 on bus 15 or the output data from the output latch 3 on bus 14' according to a part of the command applied to the input latch 1. In the case of a logical operation or an arithmetical operation, the second input data in the input latch 1 from bus 15 is selected as an output of the MPX 5 and is processed in ALU 2 together with the first input data applied thereto via the bus 12. In the case of an address generation, the feedback output from the output latch 3 is selected and processed in ALU 2 together with the first input data via the bus 12. During the address generation, the busy signal 22 is sent to the queue memory 6 to inhibit sending-out of data from the queue memory 6.

The input latch 1 and the output latch 3 latch data in response to a pipeline clock, and form a pipeline bus. Further, the control section 4 designates a kind of operation of the ALU 2 on a basis of another part of the command received in the input latch 1, and generates a operation designating signal 19.

Figure 2:
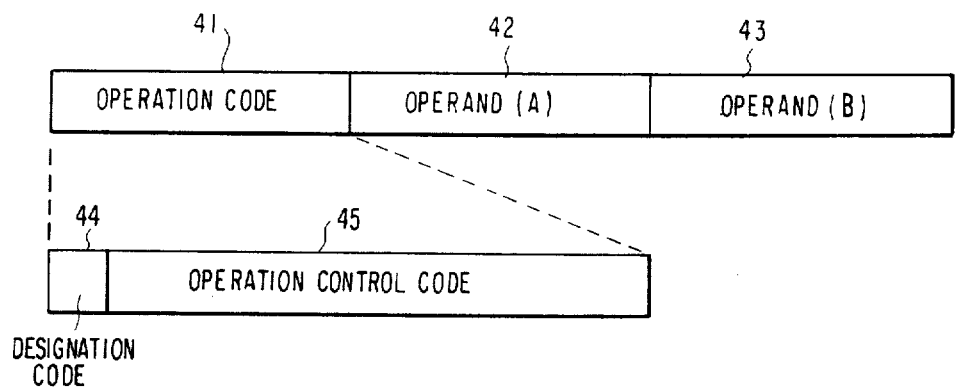
FIG. 2 shows a data format to be received in an input latch of FIG. 1.

FIG. 2 shows an example of a data field format of the input latch 1. An input data applied to the input latch 1 consists of an operation code 41 and two operands 42 and 43. The operation code 41 includes at least two portions 44 and 45. The portion 44 is a designation code for commanding a function of the MPX 5. When the designation code designates a a logical and/or an arithmetical operation, the portion 45 is specification code for specifying the kinds of operation of the ALU 2. On the other hand, when the designation code 44 designates the address generation, the portion 45 is a data indicating the number of addresses to be generated. The operand (A) 42 is applied as the first input data to ALU 2 via the bus 12. The operand (B) 43 is applied to MPX 5 via the bus 15 as the second input data.

When a logical and/or an arithmetical operation is designated, control section 4 generates a selecting signal 18 for selecting the input bus 15. Therefore, the operand (A) 42 and the operand (B) 43 are transferred to the ALU 2 through buses 12 and 16, respectively. The ALU 2 executes an operation specified by a specification code 45 by using the two operands (A) and (B).

When an address generating operation is designated, the MPX 5 selects an operand (B) 43 via the bus 15 only during a first pipeline clock period to make a starting value or a starting address and selects an output data from the output latch via the bus 14' during the succeeding pipeline clocks. Further, the control section 4 generates a control signal 19 for designating an "addition" operation. Consequently, in an address generating operation, the output latch 3 sends sequential addresses $A+B$, $A+(A+B)=2A+B$, $3A+B$, ... $nA+B$ to a next pipeline stage such as a memory stage (not shown) via the output bus 14. Here, the numeral n means the number of addresses to be generated and is set in the portion 45 of the input latch 1. The numeral B means a starting value, and the numeral A means an increment value.

As described in the above, since the address generation can be executed by the operational circuit, an addressor function can be easily integrated in a processor module having a memory which can be formed on a semiconductor chip without increasing a chip size. Therefore, memory access speed becomes extremely fast, and performance of a processor becomes high. The address generation is generally continued during a plurality of pipeline clock periods. During these periods, the input latch 1 does not receive a new input data. Therefore, it is to be noted that the queue memory 6 has to be coupled between an external circuit or a foregoing pipeline stage and the input latch 1 of the operational pipeline stage so as to hold the new input data.

Figure 3:
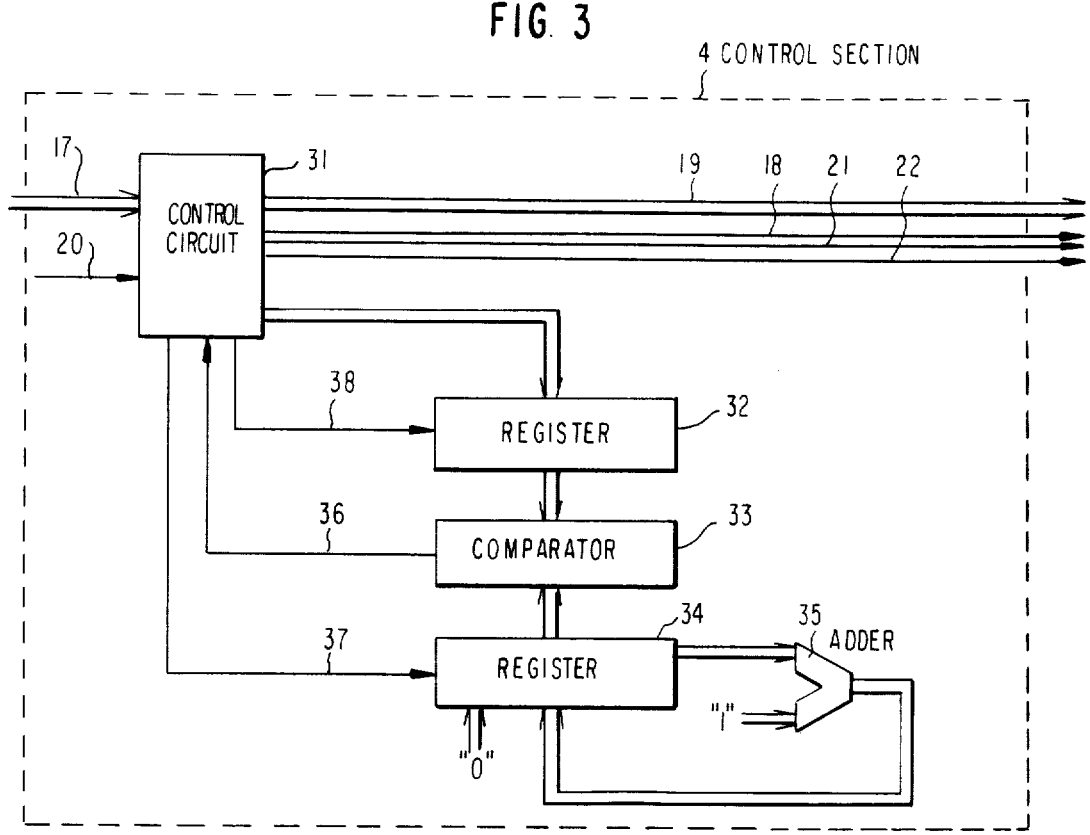
FIG. 3 shows a brief block diagram of a control section shown in FIG. 1.

FIG. 3 is a detailed block diagram of the control section 4 shown in FIG. 1. The control section 4 includes a control circuit 31, registers 32 and 34, a comparator 33 and an adder 35. Command of the input latch 1 of FIG. 1 is entered into the control circuit 31 through the bus 17. When the field 44 indicates the operation code of a logical and/or an arithmetic operation, a selecting signal 18 is generated to select the input bus 15 to the MPX 5. In addition, an operation code 19 of a field 45 is applied to the ALU 2. Clock pulses on a pipeline clock bus 20 are converted to clock bus 21 for transmission to the input latch 1, while for the output latch 3, the clock pulses on pipeline clock bus 20 are applied directly.

On the other hand, when the field 44 indicates an address generation, the data of the field 45 is set in the register 32 in response to a set signal 38 produced by the control circuit 31. An addition code is applied to the ALU 2 as an operation code 19. The register 34 is cleared at an initial condition, and then is incremented by one at every address generation. This increment operation is executed by the adder 35. Outputs from the registers 32 and 34 are compared with each other by the comparator 33. When the content of the register 34 becomes equal to the content of the register 32, a stop signal 36 is generated to stop the address generation. The control circuit 31 sends a clear signal 37 to the register 34 in response to the stop signal 36. Until the address generation is terminated, the control circuit 31 inhibits application of clock pulses on clock bus 21 to the input latch 1, so that the data of the input latch 1 is kept as it is. During the same period, the control circuit 31 sends a busy signal 22 to the queue memory 6. The queue memory 6 blocks a new data input for the input latch 1 and holds the new data to be applied to the input latch 1.

Figure 4:
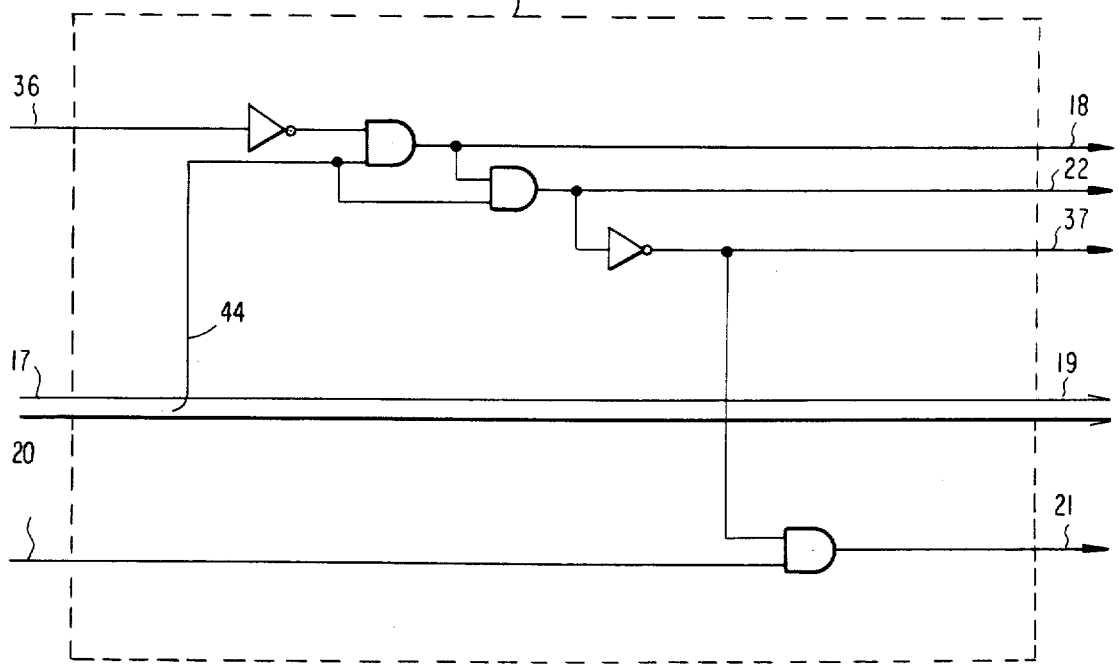
FIG. 4 shows a block diagram of a control circuit illustrated in FIG. 3.

FIG. 4 is a detailed block diagram of the control circuit 31 shown in FIG. 3, and illustrates stop signal line 36, a data bus 17, a pipeline clock pulse line 20, a selecting signal line 18, a busy signal line 22, a clear signal line 37, an operation code line 19, a clock line 21, and a designation code line 44. The designation code on line 44 may be one bit of the command entered into the input latch 1. This code signal one line 44 produces a selecting signal on line 18 together with a stop signal on line 36. The busy signal on line 22 is produced by the selecting signal on line 18 and the designation code signal on line 44, and inhibits a data read operation of the queue memory 6. The clear signal on line 37 is produced by inverting the busy signal on line 22, and loads zero to the register 34 shown in FIG. 3. The operation code indicates kinds of operation of the ALU and the number of addresses to be generated. The clock pulse on line 21 is a latch pulse applied to the input latch 1.

In this embodiment, two operands 42 and 43 are entered into the input latch 1 at the same time. However these operands may be entered at a different timing into the input latch 1. In that case, a first operand 42 is transferred to the output latch 3 thorugh the input latch 1, the bus 12, and the ALU 2. A second operand 43 is transferred to the ALU 2 through the input latch 1 and the bus 15, and at the same timing an output of the output latch 3 (namely, the first operand) is applied to the ALU 2 via the MPX 5.

According to the present invention, since the multiplexer for selecting either the input latch or the output latch and a feedback loop for returning an output data of the output latch to the ALU are provided within a uni-directional pipeline bus, a processor module having both a logical and/or an arithmetical operation function and an address generation function can be produced by the same hardware circuit. Therefore, the addressor module can be integrated within the processor module, so that a high performance and a high processing speed can be easily obtained. Further, the described address generation function may be used as a timer function, a counter function, etc.

What is claimed is:

1. A data flow-type digital processing apparatus comprising: an input latch including a first section storing a first data, a second section storing a second data, and a third section storing a designation code;
  a processing unit having a first input end, a second input end and an output end and adapted to execute an arithmetic operation and/or a logic operation using two input data which are supplied to said first and second input ends;
  an output latch including a section storing a result of the arithmetic operation and/or a logic operation of said processing unit;
  a multiplexer having a first input portion, a second input portion and an output portion and inserted between said input latch and said processing unit;
  a first bus coupling said first section of said input latch to said first input end of said processing unit;
  a second bus coupling said second section of said input latch to said first input portion of said multiplexer;
  a third bus coupling said output portion of said multiplexer to said second input end of said processing unit;
  a fourth bus coupling said output end of said processing unit to the storing section of said output latch;
  a fifth bus coupled to said output latch for deriving the result of the storing section of said output latch;
  a sixth bus coupling said output latch to said second input portion of said multiplexer to feed back the result of the storing section to said multiplexer; and,
  a control unit coupled to said input latch and said multiplexer for selectively applying a first signal and a second signal to said multiplexer according to said designation code stored in said third section of said input latch, said second bus being coupled to said third bus in response to said first signal, said sixth bus being coupled to said third bus in response to said second signal.

2. A data flow-type digital processing apparatus as claimed in claim 1, in which said input latch further includes a fourth section storing an operation code designating a number of coupling of said sixth bus and said third bus, said second signal being applied to said multiplexer according to said operation code.

3. A data flow-type digital processing apparatus as claimed in claim 2, in which said control unit has a register storing said operation code, a counter counting a number of operation of said processing unit, and a comparator comparing said operation code of said register with a content of said counter for controlling the second signal application.

4. A data flow-type digital processing apparatus as claimed in claim 1, further comprising a queue memory coupled to said input latch for holding at least one input data having said first and second data and said designation code to be entered into said input latch during said processing unit executes the arithmetic operation and/or the logic operation of said first data stored in said first section of said input latch and a data fed back from said output latch through said sixth bus.

* * * * *